US011301918B1

(12) United States Patent
McEneny, Sr. et al.

(10) Patent No.: US 11,301,918 B1
(45) Date of Patent: *Apr. 12, 2022

(54) INVOICING PORTAL WITH EASY SEARCH AND EASY USER COMMUNICATION

(71) Applicant: VERSATA, INC., Austin, TX (US)

(72) Inventors: Timothy S. McEneny, Sr., Colts Neek, NJ (US); Erick W. Schutz, South Belmar, NJ (US); Joseph E. Fallon, Liverpool, NY (US); Aleksandr Shmukler, Manalapan, NJ (US)

(73) Assignee: Versata, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,340

(22) Filed: Aug. 13, 2019

Related U.S. Application Data

(63) Continuation of application No. 11/369,317, filed on Mar. 6, 2006, now Pat. No. 10,410,274.

(51) Int. Cl.
  *G06Q 30/00* (2012.01)
  *G06Q 30/06* (2012.01)
  *G06Q 40/02* (2012.01)
  *G06Q 30/04* (2012.01)

(52) U.S. Cl.
  CPC ......... *G06Q 30/0633* (2013.01); *G06Q 30/04* (2013.01); *G06Q 30/0635* (2013.01); *G06Q 40/02* (2013.01)

(58) Field of Classification Search
  CPC .......... G06Q 30/0633; G06Q 30/0635; G06Q 30/04; G06Q 40/02
  See application file for complete search history.

(56) References Cited

U.S. PATENT DOCUMENTS

| | | | |
|---|---|---|---|
| 6,826,542 B1 | 11/2004 | Virgin et al. | |
| 7,426,492 B1 * | 9/2008 | Bishop | G06Q 20/02 705/38 |
| 7,899,690 B1 * | 3/2011 | Weinstock | G06Q 30/02 705/5 |
| 7,979,328 B1 * | 7/2011 | Chapman | G06Q 20/10 705/34 |
| 8,600,783 B2 * | 12/2013 | Smith | G06Q 10/02 705/5 |

(Continued)

OTHER PUBLICATIONS

"World Wide Technology Enables 900 Suppliers in Under Six Months with ClearOrbit's Purchase Order Collaborator," Business Wire [New York], Feb. 1, 2006: 1 (Year: 2006).*

(Continued)

*Primary Examiner* — Anne M Georgalas

(57) ABSTRACT

An electronic invoicing system provides a web-based portal with respective views for a suppliers submitting electronic invoices and a user of an enterprise submitting and/or reviewing electronic invoices. The portal displays a user interface on a screen that enables a supplier or user to retrieve or create information related to an electronic invoice, purchase order or requisition number using a text fields and icons. An administrator is able to enter information to be provided to the suppliers via a home screen of the web-based portal, and the system includes software tools enabling the information to be published on the home screen of the portal without web-based programming.

24 Claims, 20 Drawing Sheets

(56) References Cited

U.S. PATENT DOCUMENTS

| | | | |
|---|---|---|---|
| 2003/0182206 A1* | 9/2003 | Hendrix | G06Q 30/0601 705/26.1 |
| 2004/0098292 A1* | 5/2004 | Miller | G06Q 99/00 709/224 |
| 2004/0098307 A1* | 5/2004 | Uehara | G06Q 30/02 705/14.49 |
| 2004/0139001 A1* | 7/2004 | Henriques | G06Q 30/0601 705/39 |
| 2004/0143474 A1* | 7/2004 | Haeberle | G06Q 50/163 705/314 |
| 2004/0215528 A1* | 10/2004 | Tan | G06Q 30/0633 705/26.8 |
| 2005/0251477 A1* | 11/2005 | Chang | G06Q 20/102 705/40 |
| 2006/0095373 A1* | 5/2006 | Venkatasubramanian | G06Q 20/102 705/40 |
| 2008/0140562 A1* | 6/2008 | Kerdachi | G06Q 20/102 705/38 |

OTHER PUBLICATIONS

"Supply Chain; Dixons rolls out XML platform to streamline tits global supply chain," by Karen Gomm, Computer Weekly: 5, Reed Business Information Ltd (Apr. 19, 2005) (Year: 2005).*

"PurchasingNet, Inc. is the 'Pro to Know' in Supply Chain Management," New Jersey Business 51.11: 62, Newark: New Jersey Business & Industry Association (Nov. 1, 2005) (Year: 2005).*

"The implications of electronic BB intermediaries for the buyer-supplier interface," by Ronan McIvor and Paul Humphreys, International Journal of Operations & Production Management 24. 3/4:241-269. Emerald Group Publishing Limited (2004) (Year: 2004).*

"Industri-Maternatik Unveils Supply Chain and Customer Service Portal Capabilities," Business Wire [New York], Feb. 20, 2001 (Year: 2001).*

Notice of Allowance dated Apr. 24, 2019, filed in U.S. Appl. No. 11/369,317, pp. 1-18.

Response to Non-Final Office Action dated Jan. 10, 2019, filed in U.S. Appl. No. 11/369,317, pp. 1-19.

Non-Final Rejection dated Jul. 10, 2018, filed in U.S. Appl. No. 11/369,317, pp. 1-39.

Request for Continued Examination dated Mar. 20, 2018, filed in U.S. Appl. No. 11/369,317, pp. 1-25.

Response to Non-Final Office Action dated Aug. 21, 2017, filed in U.S. Appl. No. 11/369,317, pp. 1-18.

Non-Final Rejection dated Mar. 20, 2017, filed in U.S. Appl. No. 11/369,317, pp. 1-44.

Request for Continued Examination dated Nov. 7, 2016, filed in U.S. Appl. No. 11/369,317, pp. 1-26.

Response to Non-Final Office Action dated Feb. 11, 2016, filed in U.S. Appl. No. 11/369,317, pp. 1-19.

Non-Final Rejection dated Sep. 11, 2015, filed in U.S. Appl. No. 11/369,317, pp. 1-47.

Request for Continued Examination dated Aug. 14, 2014, filed in U.S. Appl. No. 11/369,317, pp. 1-17.

Final Rejection dated Feb. 14, 2014, filed in U.S. Appl. No. 11/369,317, pp. 1-41.

Response to Non-Final Office Action dated Nov. 6, 2013, filed in U.S. Appl. No. 11/369,317, pp. 1-12.

Non-Final Rejection dated Jun. 6, 2013, filed in U.S. Appl. No. 11/369,317, pp. 1-38.

Request for Continued Examination dated Oct. 11, 2012, filed in U.S. Appl. No. 11/369,317, pp. 1-18.

Final Rejection dated Apr. 11, 2012, filed in U.S. Appl. No. 11/369,317, pp. 1-40.

Response to Non-Final Office Action dated Jan. 20, 2012, filed in U.S. Appl. No. 11/369,317, pp. 1-11.

Non-Final Rejection dated Jul. 20, 2011, filed in U.S. Appl. No. 11/369,317, pp. 1-35.

Request for Continued Examination dated Nov. 26, 2010, filed in U.S. Appl. No. 11/369,317, pp. 1-15.

Final Rejection dated May 26, 2010, filed in U.S. Appl. No. 11/369,317, pp. 1-35.

Response to Non-Final Office Action dated Mar. 9, 2010, filed in U.S. Appl. No. 11/369,317, pp. 1-9.

Applicant Response to Pre Exam Formalities Notice dated May 19, 2006, filed in U.S. Appl. No. 11/369,317, p. 1.

Non-Final Rejection dated Sep. 9, 2009, filed in U.S. Appl. No. 11/369,317, pp. 1-18.

* cited by examiner

FIG. 4

Welcome, Todd Brookstone [Sign Out]

| Home | Invoices | Reports |
| 410 | 420 | 430 |

Information
△ Information
⚙ Preferences
▦ Your Information

Unsaved Changes:
⚙ Preferences

440

Information

ⓘ Partnering With Us — 450

Latest News
Check here on a regular basis to find the latest news about our company or the Supplier Invoice Portal product.

Frequently Asked Questions
This topic contains answers to questions that are typically asked concerning partnerships with us and how to use this portal.

Terms and Conditions
By using this portal you agree to the terms and conditions outlined in this document.

Payment Terms
We can now process and pay electronic invoices quickly and efficiently.

ⓘ Help using this site

Help topics require the Adobe Reader. If it is not installed on your machine click the logo below.

[Get Adobe Reader]

Quick Start Guide
If you've never used this site before this topic provides a good overview to help you get started. The guide describes the purpose of the portal, navigation, and user interface elements that are common throughout the site.

Options for PO Invoicing
If you would like to submit Purchase Order related invoices then you should read this topic for a basic understanding of the invoice process, various ways to submit and amend invoices, and how to retrieve information about invoices that have been submitted.

Options for Non-PO Invoicing
This topic should be read if your would like to submit invoices that are not related to a Purchase Order (Non-PO Invoices). This covers a basic understanding of the invoice process, various ways to submit and amend invoices, and how to retrieve information about previously submitted invoices.

FIG. 7

Setup Options

| Field Name △ | Description | Current Value | Edited By | Actions |
|---|---|---|---|---|
| AUDITEINVOICE | Should auditing of the eInvoice file be enabled? (Y/N) | Y | PurchasingNet Messages | |
| AUDITNPOINVOICE | Should auditing of the Non-PO Invoice file be enabled? (Y/N) | Y | PurchasingNet Messages | |
| CXMLENABLED | Is CXML file uploading and processing enabled? (Y/N) | N | Ed Ministrator | |
| CXMLSITE | CXML Web Site for supplier CXML documents to be posted. | http://www.customer.com/cxml | PurchasingNet Messages | |
| CXMLTESTSITE | CXML Web Site for supplier CXML documents to be posted during testing. | http://www.customer.com/cxmltest | PurchasingNet Messages | |
| MAILINVOICEACKNOW | Should e-mail acknowledgements be forced to suppliers when they create invoices within the portal? (Y/N) | N | PurchasingNet Messages | |
| MAILSENDEREMAIL | The FROM address on system generated e-mails. | name@company.com | PurchasingNet Messages | |
| MAILSENDERENABLED | Should administrators receive e-mails for all errors? (Y/N) | N | PurchasingNet Messages | |
| MAILSENDERNAME | The FROM name on system generated e-mails. | ePayables | PurchasingNet Messages | |
| MAILSERVER | The IP address or DNS name of SMTP gateway or mail server. | mail.company.com | PurchasingNet Messages | |
| NPOAPPROVERNOTE | When are notes from approvers required? (N=Never P=Approval R=Reject A=Always) | N | PurchasingNet Messages | |
| SECURITYCAPTCHAEMP | Should CAPTCHA verification be required for employee logins (Y/N or Number, 0=Yes)? | N | PurchasingNet Messages | |
| SECURITYCAPTCHASUPP | Should CAPTCHA verification be required for supplier logins (Y/N or Number, 0=Yes)? | 1 | Sales Demonstrator | |
| SECURITYDICTALERT | Send e-mail alerts to Administrators when dictionary attacks are suspected? (Y/N) | N | PurchasingNet Messages | |
| SYSTEMAPPNAME | Name of the application that is | ePayables | PurchasingNet Messages | |

| Field Name | Data Type | Label | Show Supplier | Show Approver | Show G/L Coder |
|---|---|---|---|---|---|
| Invoice Number | Character (40) | Invoice Number | ☑ | ☑ | ☑ |
| Invoice Description | Character (60) | Invoice Description | ☑ | ☑ | ☑ |
| Invoice Date | Date | Invoice Date | ☑ | ☑ | ☑ |
| Ordered Date | Date | Ordered Date | ☑ | ☑ | ☑ |
| Invoice Total | Money | Invoice Total | ☑ | ☑ | ☑ |
| Buying Company (Code) | Character (10) | Buying Company | ☑ | ☑ | ☑ |
| Ship To (Code) | Character (10) | Ship To | ☑ | ☑ | ☑ |
| Bill To (Code) | Character (10) | Bill To | ☑ | ☑ | ☑ |
| Payment Terms | Character (20) | Terms | ☐ | ☐ | ☐ |
| Supplier (Code) | Character (10) | Supplier | ☑ | ☑ | ☑ |
| Remit To (Code) | Character (15) | Remit To | ☑ | ☑ | ☑ |
| Freight On Board (Code) | Character (10) | FOB | ☐ | ☐ | ☐ |
| Ship Via (Code) | Character (10) | Ship Via | ☐ | ☐ | ☐ |
| Buyer (Code) | Person | Buyer | ☑ | ☑ | ☑ |
| Requestor (Code) | Person | Requestor | ☐ | ☐ | ☐ |

*FIG. 9*

*FIG. 10*

Validation Rules
Create or search for validation rules (?)

| Validation Rule Search Criteria: | | | |
|---|---|---|---|
| ☐ Description | equals | | ▼ |
| ☐ Applies To Field | equals | | ▼ |
| ☐ Attached To Invoice Type | ⦿ Any  ○ None  ○ Selected | {New Model} | ▼ |
| ☐ Type | ⦿ Internal  ○ External | | |
| ☐ Active | ⦿ Yes  ○ No | | |
| Sort By | ⦿ Description  ○ Applies To Field  ○ Type  ○ Active | | |

[ Search ]  [ Clear Form ]  (( Create New ))

Create New Validation Rule
Creating a new Validation rule (?)

Implementation

Description: [ Requestor                    ]

Applies To Field: [ Requestor (Code) ▼ ]

Type: ⦿ Internal  ○ External    External Connection: [ Loaninfo ▼ ]

Status: ☑ Active

[ Continue ]  [ Cancel ]

| | | | |
|---|---|---|---|
| Overall | Field Definition | Validations | Routes | Charges |

Route Configuration

Attach Mandatory Route: (No Route) ▼

Mandatory Route Order: ○ Before Fields  ● After Fields

Attach Routes To Holder Fields

| Label | Mandatory | Attach Route | Route Order |
|---|---|---|---|
| Invoice Number | No | (No Route) | |
| Invoice Description | No | (No Route) | |
| Invoice Date | Yes | (No Route) | |
| Ordered Date | No | (No Route) | |
| Invoice Total | No | (No Route) | |
| Buying Company | Yes | (No Route) | |
| Ship To | Yes | (No Route) | |
| Bill To | Yes | (No Route) | |
| Terms | No | (No Route) | |
| Supplier | Yes | (No Route) | |
| Remit To | Yes | (No Route) | |
| FOB | No | (No Route) | |
| Ship Via | No | (No Route) | |
| Buyer | No | (No Route) | |
| Requestor | No | (No Route) | |
| Currency | Yes | (No Route) | |
| Reference | No | (No Route) | |

FIG. 15 850

| Overall | Field Definition | Validations | Routes | Charges |
|---|---|---|---|---|

Extra Charges

Available: Fuel Surcharge ▼

Selected: Fuel Surcharge

[Add] [Remove] [View Charge]

[Previous] [Save] [Cancel]

| | | |
|---|---|---|
| ☐ PO Number | starts with ▾ | |
| ☐ Requisition Number | starts with ▾ | |
| ☐ Buying Company | equals | Grey Rock International, Inc. (GR001) ▾ |
| ☐ Buyer | equals | Gail Smith ▾ |
| ☐ PO Created | in last ⦿ 10 Days ○ 30 Days ○ 90 Days ○ from<br>7/29/2005 ◇ to 7/30/2005 ◇ | |

Search Criteria:

Sort By  ⦿ PO Number  ○ Buyer  ○ Buying Company  ○ Line Count  ○ Amount

*FIG. 17*

Search Criteria:

| | | |
|---|---|---|
| ☑ Status | equals | Recorded<br>Pending Receipt<br>Rejected<br>In-Process<br>Waiting Approval<br>Approved For Payment<br>Paid |
| ☐ Remit To | equals | Fast Track Office Supplies (NY-02388) ▾ |
| ☐ Invoice Number | starts with ▾ | |
| ☐ PO Number | starts with ▾ | |
| ☐ Requisition Number | starts with ▾ | |
| ☑ Invoice Date | in last ○ 10 Days ○ 30 Days ○ 90 Days ⦿ Date Range<br>from 7/01/2005 ◇ to 7/30/2005 ◇ | |
| ☐ PO Date | in last ⦿ 10 Days ○ 30 Days ○ 90 Days ○ Date Range<br>from 7/29/2005 ◇ to 7/30/2005 ◇ | |

Sort By  ⦿ PO Number  ○ Invoice Number  ○ Invoice Date  ○ Invoice Amount  ○ Status

*FIG. 18*

| ☑ PO Number | starts with ▼ |
|---|---|
| ☐ Requisition Number | starts with ▼ |
| ☐ Buying Company | equals |

FIG. 19

| Search Criteria: | | |
|---|---|---|
| ☑ PO Number | contains ▼ | 005 |
| ☐ Requisition Number | starts with ▼ | |
| ☐ Buying Company | equals | Grey Rock International, Inc. (GR001) |
| ☐ Buyer | equals | Gail Smith |
| ☑ PO Created | in last ○ 10 Days ○ 30 Days ○ 90 Days ● from | 7/6/2005 ◇ to 8/7/2005 ◇ |

FIG. 20

Invoice Status
Search for invoices
(?)

| | | Search Criteria: |
|---|---|---|
| ☑ Status | equals | Recorded / Pending Receipt / Rejected / In-Process / Waiting Approval / Approved For Payment / Paid |
| ☐ Remit To | equals | Fast Track Office Supplies (NY-02388 |
| ☐ Invoice Number | starts with ▼ | |
| ☐ PO Number | starts with ▼ | |
| ☐ Requisition Number | starts with ▼ | |
| ☑ Invoice Date | in last ○ 10 Days ○ 30 Days ○ 90 Days ● Date Range | from 08/01/2005 ◇ to 08/06/2005 ◇ |

FIG. 21

| | | Search Criteria: | |
|---|---|---|---|
| ☑ Status | equals | Recorded<br>Pending Receipt<br>Rejected<br>In-Process<br>Waiting Approval<br>Approved For Payment<br>Paid | |
| ☑ Remit To | equals | Fast Track Office Supplies (NY-02388) | ▾ |

*FIG. 22*

| | | Search Criteria: | |
|---|---|---|---|
| ☐ PO Number | starts with ▾ | | |
| ☑ Invoice Number | starts with ▾ | 05 | |
| ☐ Item Number | starts with ▾ | | |
| ☐ Invoice Created | in last ● 10 Days ○ 30 Days ○ 90 Days ○ Date Range<br>from 08/6/2005 ◇ to 8/7/2005 ◇ | | |
| Sort By | ○ Invoice Number ○ PO Number ○ Line Count ● Amount | | |

*FIG. 23*

Uninvoiced Purchase Orders
Search for uninvoiced purchase orders (?)

| | | Search Criteria: | |
|---|---|---|---|
| ☐ PO Number | starts with ▾ | | |
| ☐ Requisition Number | starts with ▾ | | |
| ☑ Buying Company | equals | Grey Rock International, Inc. (GR001) | |
| ☐ Buyer | equals | Gail Smith | |
| ☑ PO Created | in last ○ 10 Days ○ 30 Days ○ 90 Days ● Date Range<br>from 06/01/2005 ◇ to 08/31/2005 ◇ | | |
| Sort By | ● PO Number ○ Buyer ○ Buying company ○ Line Count ○ Amount | | |

[ Search ] [ Clear Form ]

*FIG. 24*

Uninvoiced Purchase Orders

Total POs: 2

| PO Number △ | Buyer | Buying Company | Line Count | Amount | Action |
|---|---|---|---|---|---|
| 05-20010 | Gail Smith | Grey Rock International, Inc (GR001) | 3 | 771.60 | ↺ |
| 05-20399 | Gail Smith | Grey Rock International, Inc (GR001) | 3 | 3,990.20 | ↺ |

PO U-Turn Search Results

Total POs: 2

| PO Number | Buyer | Buying Company | Line Count | Amount △ | Action |
|---|---|---|---|---|---|
| 05-20399 | Gail Smith | Grey Rock International, Inc (GR001) | 3 | 3,990.20 | ↺ |
| 05-20010 | Gail Smith | Grey Rock International, Inc (GR001) | 3 | 771.60 | ↺ |

PO U-Turn Search Results

Total POs: 1

| PO Number △ | Buyer | Buying Company | Line Count | Amount | Action |
|---|---|---|---|---|---|
| 05-20399 | Gail Smith | Grey Rock International, Inc (GR001) | 3 | 3,990.20 | ↺ |

PurchasingNet, Inc.
eProcurement & ePayables solutions

Supplier
Invoice Portal
Supplier View for: Fast Track
Office Supplies

Invoice: f56777    ⟿
Purchase Order: ____    ⟿
Requisition: ____    ⟿

Welcome, Jackie Williams [Sign Out]

Home | Invoices | Reports

Reports :
△ Invoice Status
▱ Uninvoiced POs

Unsaved Changes :
⟿ New Invoice

Invoice Status Results

Total POs: 1   Invoices: 1    For Supplier Fast Track Office Supplies    ✕

| Purchase Order △ | Invoice Number | Invoice Date | Invoice Amount | Status | Action |
|---|---|---|---|---|---|
| 05-20010 | F56777 | Aug 07, 2005 | 771.60 | Recorded | |
| | | | | | 1 |

Unresolved rejected invoices will be purged 30 days after they are recorded.

*FIG. 30*

| Business Information |
|---|
| Editing business information with a title of 'Hardware Upgrade' |

(?)

| Configuration |
|---|

Title: | Hardware Upgrade |

Brief Description: | The IT Department is planning a hardware upgrade of the Employee View servers. Click this topic to find out about the upgrade plan. |

[Paragraph ▾] [Font ▾] [Size ▾] [Color ▾]

B *I* U abc X₂ X²

Text: | The IT Department is planning to upgrade the web servers and database servers on October 8th, 2005. Since the upgrade will occur over the weekend we suggest that you not use the system on that day.
The System should be operational on the following Monday morning. |

[ Design | HTML ]

(maximum of 4,000 characters)

| Audit |
|---|
| Last Updated: Dotson, Mary - Oct 04, 2005 11:59 AM |

[ Save ] [ Cancel ]

*FIG. 33*

| Business Information |
|---|
| Create or edit business information content |

?

Supplier Logon Screen

| Section Title: | Helpful Links |
|---|---|

| | Available | | Selected |
|---|---|---|---|
| Messages: | Hardware Upgrade<br>Latest News<br>Payment Terms | [Add]<br>[Remove] | How to login<br>Frequently Asked Questions<br>Terms and Conditions<br>Not a Supplier? Enroll Today |
| | [Edit] [Create New] [Delete] | | [Move Up] [Move Down] [Edit] |

Last Updated: Mary Dotson - Oct 6 2005 12:47PM

Supplier Home Screen

| Section Title: | Partnering With Us |
|---|---|

| | Available | | Selected |
|---|---|---|---|
| Messages: | Hardware Upgrade<br>How to login<br>Not a Supplier? Enroll Today | [Add]<br>[Remove] | Latest News<br>Frequently Asked Questions<br>Terms and Conditions<br>Payment Terms |
| | [Edit] [Create New] [Delete] | | [Move Up] [Move Down] [Edit] |

Last Updated: Mary Dotson - Oct 6 2005 12:47PM

Employee Logon Screen

| Section Title: | Helpful Links |
|---|---|

| | Available | | Selected |
|---|---|---|---|
| Messages: | Frequently Asked Questions<br>Hardware Upgrade<br>Latest News<br>Not a Supplier? Enroll Today<br>Payment Terms<br>Terms and Conditions | [Add]<br>[Remove] | How to Login |

*FIG. 34*

INVOICING PORTAL WITH EASY SEARCH AND EASY USER COMMUNICATION

FIELD OF THE INVENTION

The present invention relates generally to electronic invoicing. In particular, it relates to ease-of-use improvements in web-based portals for electronic invoicing.

BACKGROUND OF THE RELATED ART

A common activity for any business or enterprise is to receive and pay several invoices from outside suppliers or creditors. A business or enterprise often spends a considerable amount of time processing and making payments on the invoices. Various managers may have to review an invoice for accuracy and then send it to another person to approve it for payment. Once the invoice has the proper number of signatures, the invoice is deemed accurate and is approved for payment.

Both the supplier and the business incur substantial costs in billing and paying for invoices in this manner in this environment. This process has been largely manual and time consuming, has resulted in lost productivity and has virtually eliminated any possibility of providing for prompt payment of invoices. Worse, invoices occasionally get paid twice.

Electronic systems have been introduced to overcome some of these problems and disadvantages in the invoicing process. See, for example, U.S. Pat. No. 6,826,542 issued to Kenneth L. Virgin et al. However, applicants have concluded that this and other known electronic invoicing systems have several drawbacks.

In general, known electronic invoicing systems have limited functionality related to the processing of invoices. Such limited functionality is disadvantageous because when users and administrators discover that certain functions cannot be performed with the software, or are difficult to perform with the software, they tend to revert to previous manual methods to perform those functions, thus leading to a general reluctance to utilize the electronic invoicing system to its fullest extent.

As one example, the software should serve a means of building a good working relationship with good communications between the parties regarding invoice related information. Known electronic invoicing systems do not serve as a means of communication between the enterprise using the software and its suppliers. As another example, known systems utilize unusual or unfamiliar user interfaces, thus causing the users to experience a learning curve and risking reluctance to use the system. In particular, known software does not facilitate certain functions such as having to search for invoice related information when all of the information related to a transaction is not known.

As one particular example of the non-workability of prior electronic invoicing systems, it should be considered that in a purchase order-based procurement process, the invoice from the supplier can be matched to the purchase order and/or a receipt of the transaction to determine if the invoice should be paid. Acceptable tolerances can be established on price, quantity, etc. to determine if the invoice matches (within this tolerance) the data element(s) shown on the Purchase Order and/or receipt. Since the Purchase Order and receipts are transacted by the buying company, if the invoice(s) from the supplier matches, it is deemed to be accurate and is approved for payment. Known electronic invoicing systems focus on processing only these types of invoices or require users to awkwardly transition between two separate invoicing processes that are noticeably different from each other in several respects.

However, an enterprise typically pays invoices for goods and services that are not associated with a purchase order or transaction receipt. There are typically many suppliers usually including utility companies, telecommunications, emergency maintenance, marketing services, outside contractors, banks, and other external service providers which do not use purchase orders or transaction receipts (sometimes referred to as "spend categories"). If there is no prior purchase order or transaction receipt, there is no way to do a two way or three way match between an invoice and the prior purchase order or transaction receipt. If the invoice is not provided pursuant to a previous purchase order, problems are more likely to occur. The approval of such non-purchase order invoices is not facilitated by known electronic invoicing systems, and requires a different process that is not fully accommodated and seamlessly integrated into a single electronic invoicing system.

BRIEF SUMMARY

Thus, in the preferred embodiments, the invention is implemented in the form of software that provides a familiar and comfortable web portal environment for users. Through an intuitive web-based user interface, various functions are facilitated for the user and the above mentioned drawbacks of known electronic invoicing systems are overcome.

In one aspect, the portal is configured so as to contain a home screen that contains information and messages which the enterprise providing the portal wishes to publish or otherwise convey to its users in an easy manner. Tools in the software permit an administrator in the enterprise to provide the information on the home screen without having to use HTML or other programming methods associated with web publishing.

In another aspect of the preferred embodiments, the software provides a unique easy search feature that quickly and easily retrieves the status of an individual invoice or jumps into the creation of a new invoice. With this feature, a user can easily enter either an invoice, purchase order or requisition number for the search.

Finally, the software portal is configured throughout to easily process invoices that are not associated with purchase orders or transaction receipts, as well as invoices that are associated with purchase orders. The processing and searching of such invoices is seamlessly integrated with the processing and searching of information related to purchase order based invoices. This integration is present in the user interface and various functions that are performed by the system so as to provide a consistent user experience. At the same time, the system utilizes and runs control algorithms in the background that are unique to non-purchase order based invoices. Similarly, the system also makes it possible to establish and utilize unique transaction based business rules and workflows on a field by field basis for non purchase order based invoices. In short, the different types of processing are combined into a comprehensive and flexible portal that allows users to comfortably perform various functions while taking into account invoices that have no associated purchase orders or transaction receipts.

In one aspect of the invention, an electronic invoicing system provides a web-based portal with respective views for a supplier submitting electronic invoices and a user of an enterprise reviewing said electronic invoices or entering invoices into the portal on behalf of a supplier. The portal displays a user interface on a screen that enables a supplier or user to retrieve or create information related to an electronic invoice, purchase order or requisition number using a text fields and icons. An administrator is able to enter information to be provided to the suppliers via a screen of the web-based portal, and the system includes software tools enabling the information to be published on any screen of the portal without web-based programming.

BRIEF DESCRIPTION OF THE DRAWINGS

FIG. 4 is an exemplary home screen in a supplier view of a portal according to a preferred embodiment of the invention.

FIG. 7 is an example of setup options that can be configured in a preferred embodiment of the invention.

FIG. 9 is an exemplary screen for configuring the field definitions of an invoice type according to a preferred embodiment of the invention.

FIG. 10 is an exemplary setup screen for configuring a validation rule according to a preferred embodiment of the invention.

FIG. 11 is a first screen in an example process of configuring a validation rule according to a preferred embodiment of the invention.

FIG. 12 is a second screen in the example process of configuring a validation rule according to a preferred embodiment of the invention.

FIG. 14 is an exemplary screen for configuring the routes of an invoice type according to a preferred embodiment of the invention.

FIG. 15 is an exemplary screen for configuring the charges of an invoice type according to a preferred embodiment of the invention.

FIG. 17 is an PO U-Turn search screen according to a preferred embodiment of the invention.

FIG. 18 is an example of multiple criteria searching according to a preferred embodiment of the invention.

FIG. 19 is an example of a search criteria screen according to a preferred embodiment of the invention.

FIG. 20 is a demonstration of the use of multiple search types using the search criteria screen for PO U-Turn in a preferred embodiment of the invention.

FIG. 21 is a demonstration of the use of multiple search types using the search criteria screen for invoice status in a preferred embodiment of the invention.

FIG. 22 is a demonstration of selecting multiple filter values according to a preferred embodiment of the invention.

FIG. 23 is an example of an invoice number search according to a preferred embodiment of the invention.

FIG. 24 is an example of a search for un-invoiced purchase order according to a preferred embodiment of the invention.

FIG. 25 is a preferred example of sorting search results by PO Number according to a preferred embodiment of the invention.

FIG. 26 is an example of sorting a PO U-Turn search results screen according to a preferred embodiment of the invention.

FIG. 27 is an exemplary illustration of an indication that a listed PO can be converted to an invoice according to a preferred embodiment of the invention.

FIG. 30 is an illustration of the invoice status results screen using the Easy Search feature.

FIG. 33 illustrates a software tool permitting information to be published on screens of the portal according to a preferred embodiment of the invention.

FIG. 34 illustrates a selection of screens for publication of information according to a preferred embodiment of the invention.

DESCRIPTION OF THE PREFERRED EMBODIMENTS

The invention may be implemented as a software module, stand-alone software, software integrated with large enterprise-wide applications such as accounts payable and general ledger modules of ERP systems, or as part of a software suite including other software such as procurement software (collectively, "software"). Preferably, the software is recorded on a tangible medium, such as a CD-ROM, and when installed and executed by a general purpose programmable computer, such as a server, causes the processing and functions described below to be performed.

Figure 1:
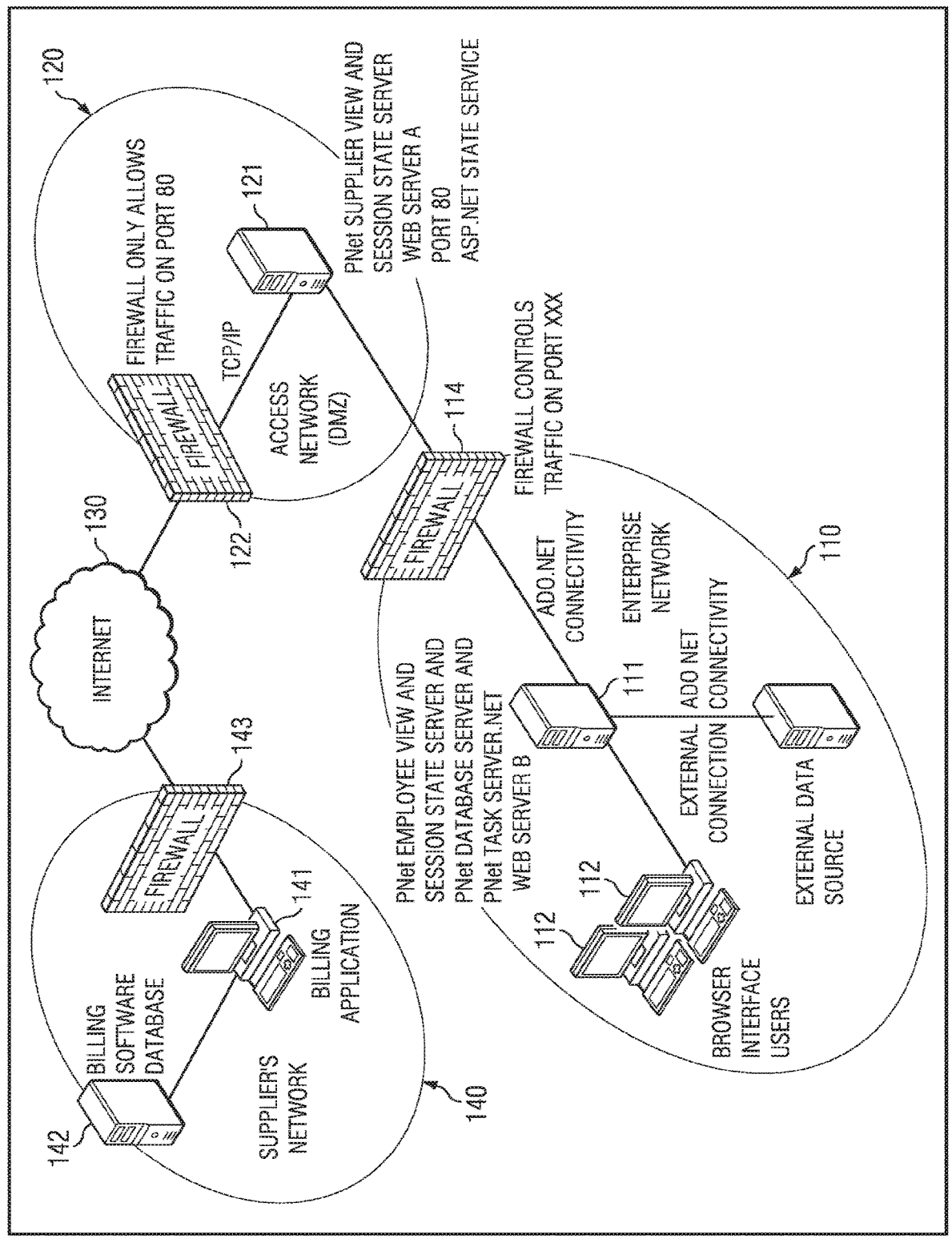
FIG. 1 is a simplified illustration of a physical architecture in which the invention may be implemented.

FIG. 1 is a simplified illustration of the network architecture in which a preferred embodiment of the invention may be implemented. The network architecture is merely exemplary, and other architectures may be used to achieve a desired balance between performance, security, request volume and maintenance. An ideal architecture is flexible enough to easily support all of these inversely proportional needs in varying degrees. Different customers operate in different ways and have only some similar requirements. This stems from particular business principles and the diverse capabilities of their Accounts Payable systems. The preferred embodiment of the software endeavors to support all related requirements as much as can be possible, and thus may be utilized in any number of different architectures.

As shown in FIG. 1, the architecture includes the system 110 of the enterprise paying the invoices, an access network 120, and a supplier 140 connected to the access network 120 through a communication network, such as the Internet 130. Although only one supplier is shown in FIG. 1, there may in fact be multiple suppliers. As explained hereinafter, the supplier 140 need not have any specialized network equipment or software. It merely needs to have Internet access and a web browser. Nothing more than an Internet browser is required on the supplier's computer. Screens are rendered completely in Hypertext Markup Language (HTML) so the smallest possible footprint is achieved. The client uses a small footprint web-based browser client that renders screens in standard HTML, which eliminates time intensive upgrades in the end user population.

However, when accessing data over Internet 130, there is often a concern about the interception of the data while it is in transit. This concern may be addressed by requiring the connection between the supplier 140 and access network 120 to utilize one or more security features. For example, it may be required that the supplier 140 utilize an appropriate secure web-based connection such as a Virtual Private Network (VPN) or a web browser that supports Secure Socket Layer (SSL). The software can generate secure HTML pages when needed, thus invoking the Secure Socket Layer (SSL) protocol. This means the web server will automatically encrypt screens so only the browser that initiated the request will be able to decode them. Such technology is widely commercially available, and these and other security features may be utilized in operating the access network 120.

Supplier 140 is not restricted to using a computer with billing application 141 along with a billing software database 142 located in a network behind a firewall 143 as shown in FIG. 1. Instead, a supplier 140 may utilize a wide number of computing devices with web-based communications capabilities. For example, the supplier system 140 may include a computer workstation, an interactive television, an interactive kiosk, a mobile computing device (such as a personal digital assistant), a mobile phone, a laptop or notebook computer, a wireless communication device, an embedded computing device, or any other suitable device. In such devices, the operating systems will likely differ and be adaptive for the particular device. However, according to the preferred embodiments, the devices advantageously continue to provide web-based communications with appropriate security.

The access network 120 has a web server 121 for providing web pages in a known manner behind firewall 122. The web server and/or other devices in access network 120 may also store basic information such as supplier information and authentication data, on-line help information, news items, etc. The authentication data may include data designed to uniquely identify each of the suppliers who use the access network 120. The web server and/or other devices in access network 120 also accesses sensitive information in system 110 as necessary to fulfill requests, inputs and inquiries from supplier 140, and does not itself store such sensitive information. Thus, the access network 120 acts as a sort of a buffer or demilitarized zone to increase the security of sensitive invoice related information stored in enterprise system 110.

The access network 120 may connect to the enterprise system 110 through a conventional telecommunication service provider, such as, for example, digital subscriber line (DSL), cable modem, fiber connection, or the like. Each system thus includes appropriate hardware and software support for such communications such as a modem, a TCP/IP stack, a Virtual Private Network (VPN) or a Secure Socket Layer (SSL). Preferably, the enterprise operates, maintains and/or controls the access network 120 as well as its own system 110, and the access network 120 instead connects to enterprise system 110 through network connectivity, such as, for example, a local or wide area network. In particular, it is preferred that ADO.Net connectivity be used between enterprise system 110 and database server 111.

As mentioned above, the enterprise system 110 accesses and stores sensitive information. There may be a wide number of alternative embodiments of the system 110 and/or access network 120, in the discretion of the enterprise. A simple embodiment as shown in FIG. 1 would be a local area network connecting a database and web server 111 on which some components of the software are installed, and a plurality of personal computers 112 or other appropriate computing devices. The software is installed on the database and web server and users of the software access various views related to the processing of invoices as described below.

Figure 2:
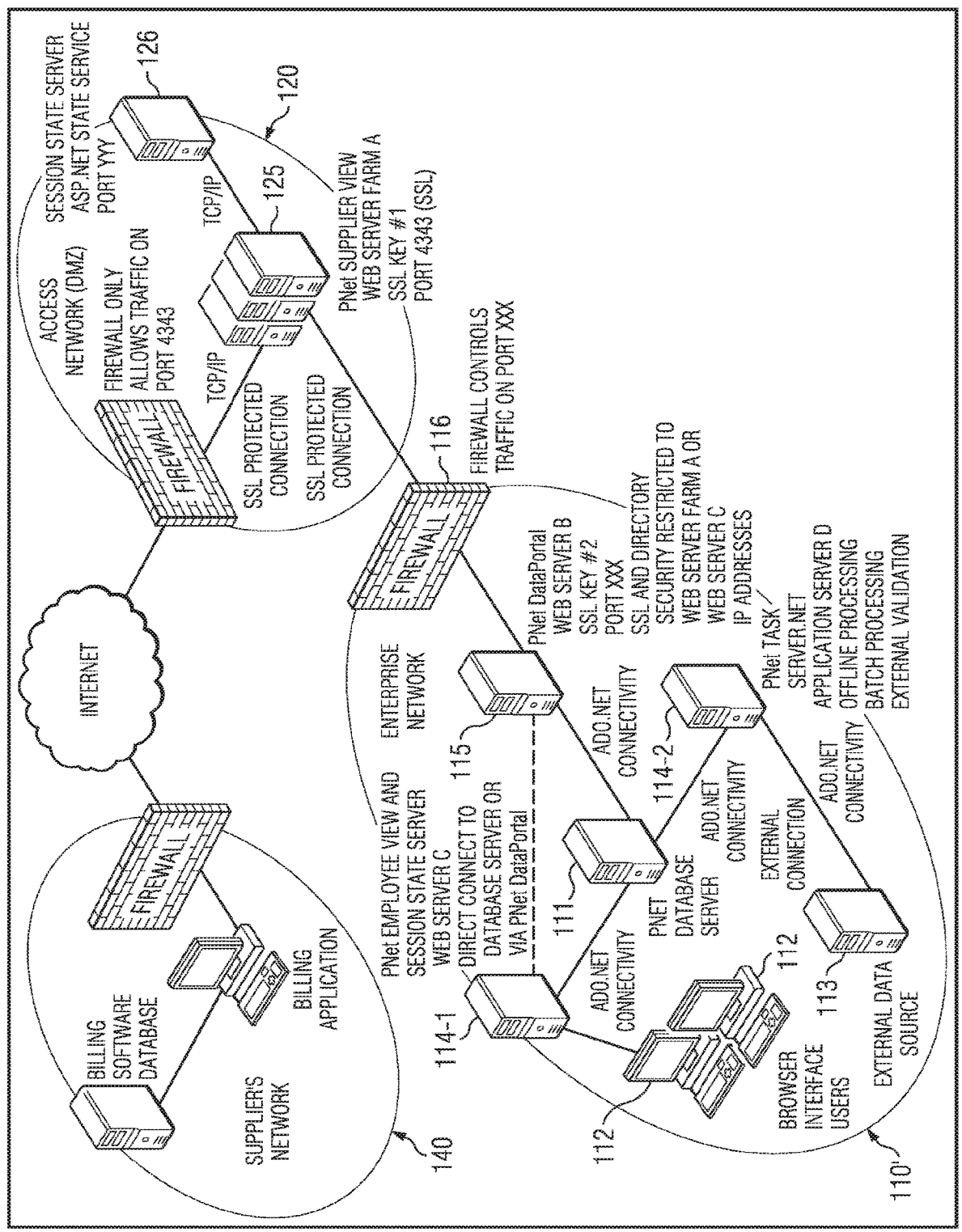
FIG. 2 is an illustration of a possible network architecture in which the invention may be implemented.

FIG. 2 shows another embodiment of enterprise system 110 and access network 120 that may be implemented. Optional DataPortal software is installed on an additional web server 113 in enterprise system 110 to provide a secure conduit between the enterprise's sensitive data and suppliers 140 who access the system through the Internet 130, access network 120 and firewall 116. The data portal is activated by simply installing the data portal software on web server 113, and changing a single configuration setting on the web server 114 that connects to web server 113. This embodiment using the DataPortal software achieves a high degree of security and performance.

The access network 120 in the embodiment of FIG. 2 utilizes a web server farm 125 and a session state server 126 with software that leverages the Microsoft ASP .Net State Service. This arrangement reduces web server affinity, present in sticky sessions, to ease operation within the web server farm 125. Configuring the farm 125 of multiple web servers, managed by a load balancer, not only increases performance in high request volume environments but also provides failover for disaster recovery purposes.

Preferably, security is provided in two ways in addition to that mentioned above with respect to the physical architecture. The software utilizes both native database security and business rules—user profiles. These security features enforce security on the database and application of the system.

The native database security provided by Microsoft SQL Server (MS-SQL) and Oracle includes user permissions and data integrity. Permissions enforce database security by specifying which users are authorized to use which tables, views, and stored procedures. Any individual or groups of individuals can be given access to read or update data, and to execute stored procedures. For example, an administrator would need full rights to all database objects, but a data entry person may only need permission to view the receipts for a given order. The software takes full advantage of the database server's data integrity mechanisms, which are implemented by foreign key constraints, referential integrity rules, triggers and table constraints to ensure that only valid transactions are completed.

Referential integrity ensures that vital data in a database, such as the unique identifier for a given piece of data, remains accurate and usable as the database changes and information is modified. The software incorporates an extensive set of business rules to define what types of data are mandatory before completing a transaction. For example, the software can be configured so that an account code must be entered and must exist in the master chart of accounts.

The software includes a powerful user profile that allows an administrator to grant access to application specific functions. Access to functions such as create invoices, retrieve invoice status, and approve invoices can be granted to individuals or groups of individuals. Even administrative permissions are granular to segregate responsibility and to maintain check and balance.

Integrated Windows Authentication (NT Challenge/Response) is fully supported so an LDAP directory, such as Windows Active Directory, can enforce user authentication and password expiration rules. CAPTCHA (Completely Automated Public Turing Test to tell Computers and Humans Apart) can be enabled on logon screens to thwart hackers who attempt to gain entry to the software by writing a dictionary attack program. In addition, dictionary attack alerts are emailed to administrators to defeat Denial of Service (DoS) threats.

Figures 3, 5:
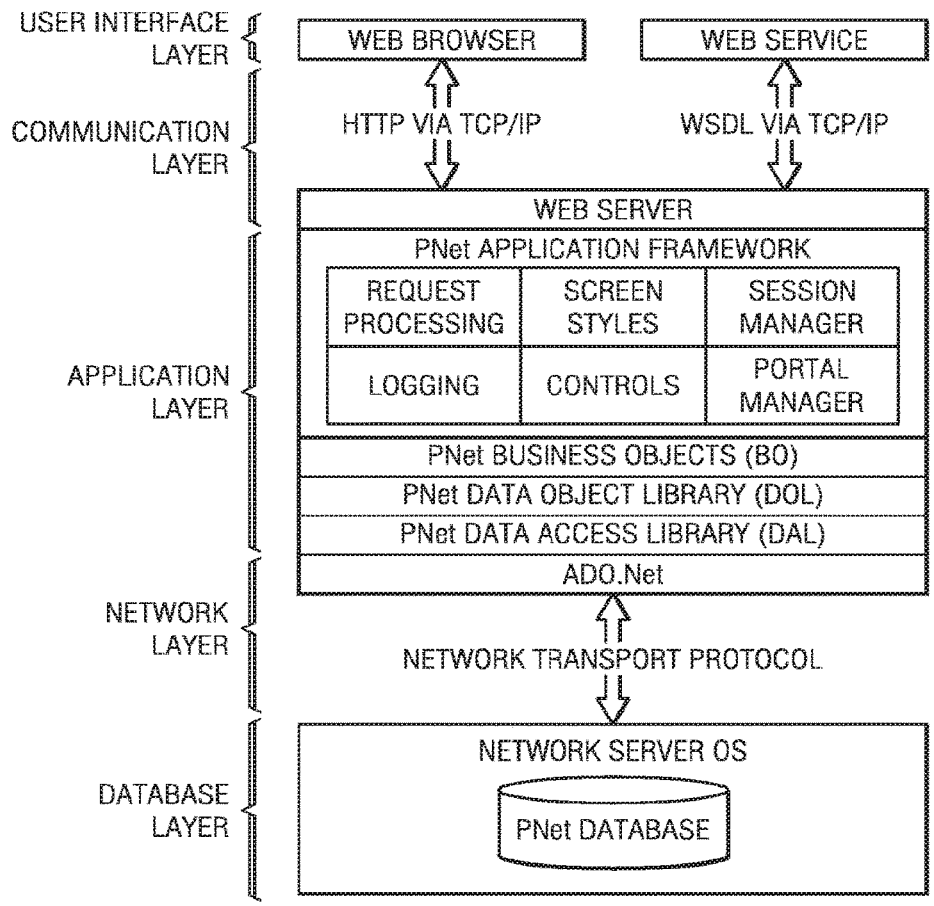
FIG. 3 is an illustration of the logical architecture of a preferred software embodiment of the invention.
FIG. 5 is an exemplary screen for changing messaging options according to a preferred embodiment of the invention.

The various components of the software can be installed on one or two devices and can be easily scaled out to more devices as needed or desired. The preferred software embodiment is written using the .NET technology platform of Microsoft Corporation located in Redmond, Wash. and is written to run on a Windows 2000 or 2003 server. FIG. 3 shows the logical architecture of the software in a preferred embodiment of the invention. The logical architecture, written in VB.net, ASP.Net and ADO.Net, is comprised of many layers, each of which is based on the Microsoft .Net Framework. With this architecture, the user interface code is partitioned from the core transaction and data specific operations. This component architecture is explained further by various materials made available in the Microsoft Developer's Network.

The software application framework is a collection of Object Oriented VB.Net and ASP.Net classes that provide enhanced functionality between the Graphical User Interface and data operations. The software utilizes custom engineered Business Objects (BO's) to encapsulate the business rules, temporary storage, data validation, and application logic that relates to transaction information. The BO's are built from the Component-based Scalable Logical Architecture .Net (CSLA.NET) framework, designed by Rockford Lhotka.

Code that relates to the retrieval and manipulation of backend database tables is partitioned into the Data Object Library (DOL). This provides a hierarchy of inherited classes for CRUD (Create, Retrieve, Update, and Delete) statements that all interfaces use in a consistent manner. Data manipulation commands within the DOL conform to ANSI 92 Structured Query Language (SQL) standards. The DOL is the only difference between product editions (MS-SQL Server and Oracle). The Data Access Library (DAL) is a collection of code container classes that encapsulate data specific methods across extraneous data sources such as MS-SQL Server and Oracle. The DAL operates via ADO.Net to communicate with the Database Management System (DBMS).

The Open BO and DOL (not illustrated) both contain empty subclasses of their parent counterparts where functionality that is not inherently supported in the software can be placed. An example of this custom functionality includes the enforcement of additional business rules, population of extra-curricular sources, or overrides to standard validations. The database incorporates the table constraints, data storage, and data integrity functions. Foreign keys and insert, update and delete triggers enforce referential integrity rules across tables.

It should be kept in mind that the logical architecture of the software is not readily apparent to users. Indeed, it may be one part of a software suite that eliminates the manual processing of invoices, preferably through the use of a web-based Supplier Invoice Portal (SIP) that allows suppliers to electronically submit and/or create invoices for a customer. As a front-end to a software suite containing the software, the portal provides a secure, highly configurable window into a company's back-end purchasing and/or accounts payable system.

The suite preferably works in conjunction with any accounts payable software and functions as a front-end to ERP and other suppliers' accounts payable systems. It virtually eliminates paper invoices, provides email approval capability, and passes approved invoices to the accounts payable system for payment.

A supplier 140 views a single supplier invoice portal (SIP) designed for use by all suppliers who conduct business with a particular enterprise and request payment by submitting invoices. The supplier invoice portal allows supplier 140 to review current business information, submit invoices for payment, correct invoice errors and resubmit invoices; and track invoice status. The portal provides the following benefits: faster receipt of approved payments, visibility for cash flow forecasting, confirmation of invoice receipt, tracking of invoices in the approval process, easy correction of invoices online, and immediate viewing of payment status.

Suppliers are set up in the supplier invoice portal and are assigned permissions by the portal administrator in enterprise 110. In this process, a supplier is designated as either a PO and/or Non-PO invoicing supplier. Permissions to use both methods for creating invoices may also be assigned to a supplier.

A significant feature is that the portal may be used by a supplier 140 who both: 1) receives Purchase Orders (PO's) and later submits invoices for payment; and 2) is approved by the enterprise to submit invoices without PO's. For the purposes of the following description of the features and functions of the supplier invoice portal from the view of a supplier 140, invoices submitted without a pre-approved PO will be referred to as Non-PO invoices. Where screen examples of a preferred embodiment are provided, it should be kept in mind that such screens may be varied as desired.

In the example of a home screen 400 shown in FIG. 4, tabs towards the top of the screen organize the portal into sections. All suppliers will see at least the Home tab 410. Since the portal is highly configurable, there may be one, two, or three main tabs for a particular supplier 140. The invoice tab 420 shows up for suppliers who have been given permission to do file transfers or to create or amend invoices. The reports tab 430 shows up for suppliers who have permission to run reports and inquiries.

In addition to submitting invoices electronically, a supplier 140 can track invoices online using the portal. This means they do not have to pick up the phone and call the Accounts Payable or Purchasing Departments to find the status of a payment. This feature can eliminate calls by as much as 80%, thereby increasing efficiency for all parties.

In another embodiment, home screen 400 will have a 'Purchase Order' searchable field displayed in the top right corner for a PO supplier (not shown). If the permission level assigned to a supplier 140 is for Non-PO invoicing only, they will not see this searchable field as well as other features for which permission is given only to PO suppliers.

The exemplary home screen of the Supplier Invoice Portal shown in FIG. 4 may also include business information and links to informational messages such as news, valuable information about business practices, or notifications of system upgrades (such as hardware upgrades). The portal administrator of enterprise 110 has the ability to create and publish business information on various screens within the portal, which are shown to either the supplier 140, or to other personnel associated with the enterprise 110. In one unique feature of the software, the portal administrator of enterprise 110 may create a particular business information message using tools within the software as shown in FIG. 33. The tools include a customizable title, brief description, and message text. For the message text, the software may use web publishing software tools such as the FreeTextbox control software developed by John Dryer so that the administrator may publish rich web content without requiring the need to know HTML or other web-based programming languages or methods. Another unique feature of the software allows the portal administrator of enterprise 110 to select individual portal screens on which to publish each business information message, as shown in FIG. 34.

By clicking an "Add" button, the administrator may select one or more business information messages that should be published, and shown, on a particular portal screen. The order in which business information messages should appear may be customized by clicking the "Move Up" and "Move Down" buttons. A customizable "Section Title" may be specified, which is used as the title of the panel on the screen where the business information is published. An exemplary "Partnering With Us" panel 450 is shown in home screen 400 of FIG. 4, although the business information may be published in any other suitable manner. The communication panel 440 contains data for all suppliers and is not unique to each user. To access the information, the supplier 140 simply moves the cursor over the desired topic, clicks the hyperlink to display the content, and closes the window to return to home screen 400.

The preferences item in the left side panel 440 leads supplier 140 to a preferences screen where they can customize their view of the supplier invoice portal. They can specify how they would like the portal to look and how they would like to be notified of transaction events.

The preferences screen may contain various categories such as screen colors and themes; and messaging options, in which transaction events can be set to trigger emails to supplier 140. The preferences screen is preferably configurable by the administrator. An example of a screen used for changing messaging options is shown in FIG. 5. The screen is preferably configurable by the administrator and, for example, may or may not include the option to enter a password question. To change the messaging preferences, supplier 140 moves the cursor over the preferences link, clicks the hyperlink to display the preferences screen, makes any change required from the list below, and clicks the Save button.

The "Your Information" link in left-side panel 440 leads the supplier 140 to a screen that displays their personal information and also the information about their supplier organization. The "Your Information" screen also contains and organizes the remit-to information for the supplier. Preferably, only information maintained in the database associated with the software is utilized.

The above discussion of the software relates to the supplier view of the supplier invoice portal as seen by a supplier 140. There is also an employee view that is seen by an employee or other personnel associated with enterprise 110 and provide access to two distinct portals—the administration portal and supplier invoice portal. The administration portal is used for managing all administration aspects of the software while the supplier invoice portal allows employees to manage and process invoices. The administration portal allows employees to maintain the software's master files, maintain users and groups with appropriate access permissions, configure setup and other system options, configure non-PO invoicing options, and generate system performance reports. The employee view also contains an employee view of the supplier invoice portal that is different than the supplier view seen by a supplier 140. In the employee view of the supplier invoice portal, employees can enter invoices on behalf of suppliers, process and manage invoices, generate invoice status reports, confirm invoice receipt, track invoices in the approval process, easily make invoice corrections online, and view payment status. Since the portals are highly configurable, not all employees will have access rights to all available functions. Some users will not have access to the administration portal, while other employees may not have full access to the supplier invoice portal.

Figure 6:
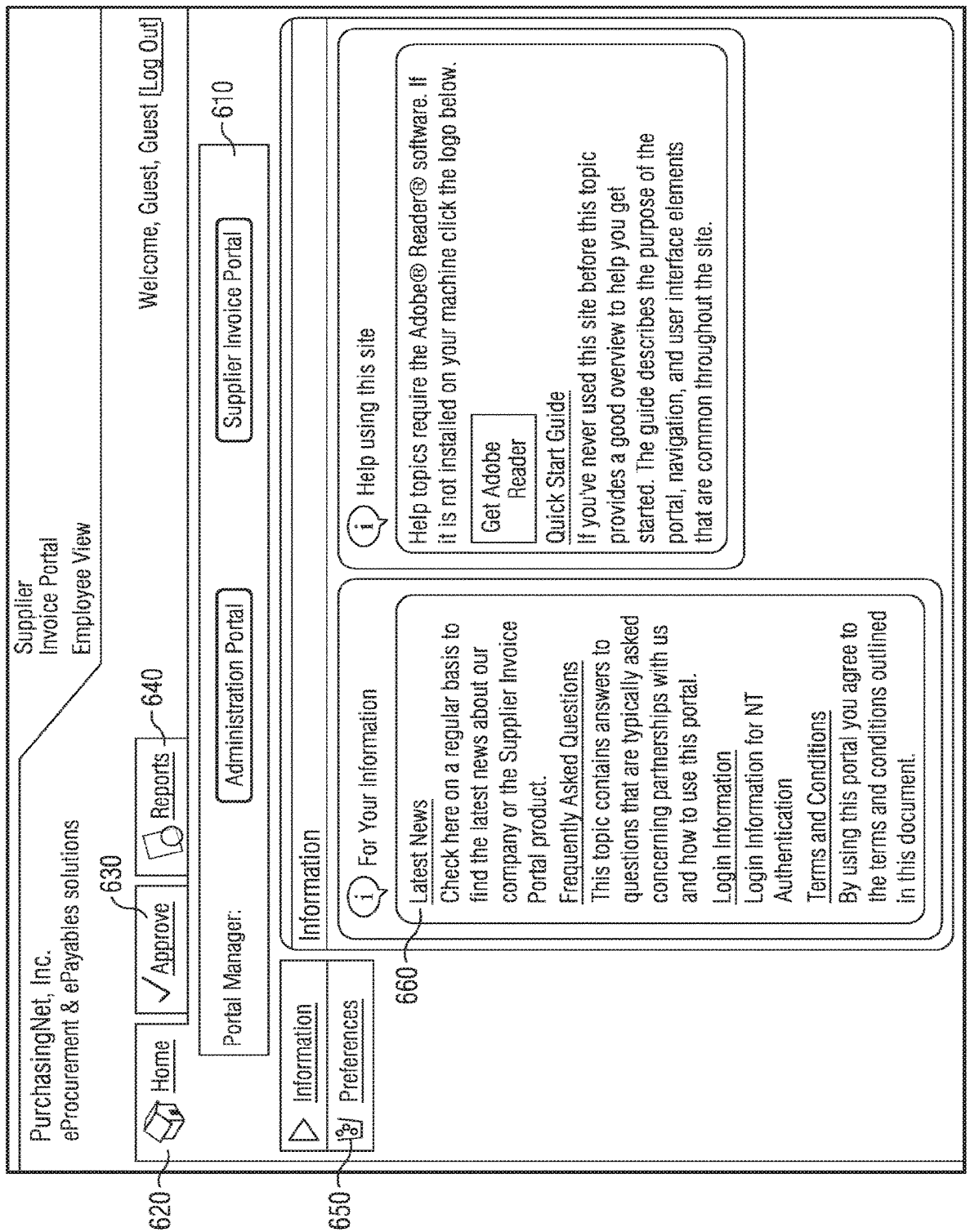
FIG. 6 is an exemplary home screen of an employee view of a portal according to a preferred embodiment of the invention.

An exemplary home screen 600 of the employee view is shown in FIG. 6. The portal manager 610 in home screen 600 also appears on the home screen of the administration portal. To switch to a different portal, an employee clicks on the appropriate button on the portal manager 610. The portal enables the software to provide a single user interface using a consistent look and feel to enhance the user experience when dealing with the system. The portal also improves usability and productivity as the learning curve is reduced from other systems that do not provide a consistent user interface.

Similar to the home screen 400 of the supplier view, home screen 600 of the employee view of the supplier invoice portal also contains tabs 620, 630 and 640. There is a left side panel 650 and a communication panel 660 with the same business information and links to news or valuable information about business practices that the supplier sees in the supplier view.

The overall interface of both views is easy and intuitive. It contains buttons and links that direct suppliers 140 through various processes such as creating an invoice or checking on the status of a payment and employees through various processes such as creating a new supplier user or approving an invoice. The navigation and other methods are similar to those already used for ordering merchandise online.

Hyperlinks are used to select functions in the portal. When the mouse is moved over a hyperlink, the cursor becomes a hand icon. Normally, a hyperlink is indicated by underlined text. Clicking the hyperlink will display information for the selected record or perform some other function. Clicking in a checkbox indicates a selection. To enter information in text fields, the cursor is clicked in the text field and the desired information is typed. Many functions appear on buttons. The button contains a label describing its purpose. When a supplier moves the mouse over an icon, the portal will display pop-up, or tool tip text which describes the function of the icon. The portal also provides user feedback through the use of an application message screen. By way of example, a message can be used to indicate that changes have been successfully changed.

Preferably, unsaved changes can also be maintained by the portal. If a supplier begins a process and then exits the screen using the browser back button before saving their changes, the portal will provide an "Unsaved Changes" warning and a hyperlink to the related screen. For example, the portal may indicate that a new invoice was started but has not been saved. The supplier can then return to the screen, and save their work by clicking on the hyperlink. Furthermore, the logout process for the portal may check for unsaved changes prior to exiting the system.

Detailed instructions for using the portal can be found by using the help function, which is available throughout the system. The portal can be configured by the administrator to automatically display full help instructions. This selection may also be managed by supplier 140 by through the preferences screen as shown in FIG. 5. If the radio button is set to Yes, then the system will display all available help on the various portal screens. If the radio button is set to No, then the system will display a question mark icon indicating that help is available for the function. The supplier clicks on the question mark icon to access help. When help is open, the supplier clicks the icon again to close help.

Based on this, some user permissions may be limited to uploading invoice data files while others may have rights to all invoicing and reporting functions. Regardless of the permissions or invoicing method(s) assigned, the following items are common to all suppliers and employees who use the portal: General Navigation; Common Icons; System Help; Use of the Home Screen; System Warning—Unsaved Changes; Search Criteria; Calendar; Sorting Columns; Export to Microsoft Excel; Print; New Search.

The software preferably is highly configurable and includes exhaustive configurability features known as Transaction Based Business Rules (TBBR's) to enforce challenging business needs. This significantly reduces costs and provides the software user with the ability to set and maintain the options themselves without customization.

There may be a large number of setup options that can be configured to tailor the software's behavior to suit disparate business needs. These system options include setup options, server configuration settings, invoice exceptions, invoice tolerances, and invoice extra charges. FIG. 7 shows an example of setup options that can be configured within the browser interface. End users can preferably customize their screens according to their particular taste. Color schemes, email messaging, and online help are examples of user preferences that can be specified and stored by each user.

A plethora of options referred to as TBBR's can be set for each type of non-purchase order invoice that is processed by the software. Such options include the labeling, visibility and validation of fields, lists of people who can use the invoice, how the invoice should be routed for approval, and extra charges that are allowed. Validation rules can be set for each field to ensure that only valid data is entered on an invoice. Rules can also limit items that can be included from the standard catalog. External connections can be linked to validation rules so a list of valid values can be maintained outside of the software.

The software preferably includes the ability to configure and customize the invoice entry experience and to control the data that should be part of a non-purchase order invoice. This makes invoice entry easier and more accurate, and helps to ensure that the appropriate data is entered.

While invoice types can be customized in great detail to facilitate invoice entry and processing, a general purpose invoice type contains the flexibility to allow its use by a variety of suppliers for many different types of goods and services. Since the ultimate goal of invoice processing is to pay the invoice via the enterprise's accounts payable system, the general purpose invoice type will reflect the data requirement of the accounts payable system to facilitate payment processing. In the following description, the aspects of establishing an invoice type, and the process required to properly configure the software, will be described in detail.

The process for configuring the TBBR for an invoice type is as follows:
  Initial definition and creation of a new invoice type.
  Definition of fields needed for the invoice type.
  Definition and creation of field validation rules.
  Definition and creation of external connection validations.
  Definition and creation of routing rules.
  Definition and creation of extra charges.
  Applying field validation rules to the new invoice type.
  Applying external connection validations to the new invoice type.
  Applying routing rules to the new invoice type.
  Applying extra charges to the new invoice type.

The TBBR for Invoice Types allow the user to configure the data entry and validation processes through the customization of field labels, field requirements (i.e., mandatory fields and field names), data validation rules, invoice routing rules, and additional charges. Every aspect of establishing an invoice type can be reviewed in order to utilize a detailed process to properly configure another important feature of the use of Transaction Based Business Rules (TBBR's) providing the ability to establish business rules and workflow by field.

The TBBR for Invoice Types thus serves as an umbrella of processing parameters for invoices corresponding to a configured invoice type. When an electronic invoice of a configured electronic invoice type is received in the portal, it is processed and checked against all of the corresponding user-defined TBBR's for that electronic invoice type. For example, if the invoice is fully acceptable but requires department manager approval, then the invoice would be routed for department manager approval. If it needs to go through accounts payable, then it would be routed through accounts payable.

Figure 8:
FIG. 8 is an exemplary screen for the overall settings in the invoice type creation and configuration according to a preferred embodiment of the invention.

FIG. 8 shows an example of a screen for the overall creation and configuration of invoice types, the configuration including field definitions, validations, routes, and charges, which can all be specified by the customer. The Overall Settings may include status, a long description available to the Supplier to distinguish between invoice types, image (icon) association, A/P export, payment control algorithms (tolerances), and General Ledger coding. Only selected suppliers may be listed for an invoice type in the overall settings for the invoice type. Suppliers see only invoice types assigned to them through use of group assignments. A supplier can be in their own group and see invoice types unique to them or they can be in a group with others.

As shown in FIG. 8, there are four tabs to which the user navigates by clicking on the tabs or by hitting the Next button on the bottom of the screen. The invoice type configuration can be saved at any time by clicking the Save button.

FIG. 9 shows the screen for defining header fields that appears when the Field Definition tab 820 is selected. The user is also able to configure line fields and distribution fields, which may be either predefined or user-defined. There are preferably checkboxes in respective columns for "Show Supplier", "Show Approver", and "Show G/L Coder."

FIG. 11 shows the screen when the Validations tab 830 is selected, which preferably include the detailed definition of validation rules used by the system. The user defines validation rules by navigating to the System Setup tab and selecting the Validation Rules hyperlink.

Validation Rules so setup apply at the field level and are used following the submission of a non-PO Invoice by the supplier. If the invoice fails any validation rules, the invoice is rejected and the supplier is notified. Typically, the supplier must then correct and re-submit the invoice before further processing can occur.

There are two basic types of validation rules. Internal rules validate the data against the software database. External rules validate the data against an external data source, such as a MS-SQL or Oracle database, or against a flat file or spreadsheet.

Figure 13:
FIG. 13 is an exemplary confirmation screen in the configuration of a validation rule according to a preferred embodiment of the invention.

An example of an internal validation rule is a rule that validates the requestor entered by the supplier. At the setup screen shown in FIG. 11, the user clicks the Create New button. On the following screen that is displayed, the user enters "Requestor" in the Description field and selects "Requestor (Code)" from the dropdown. The next screen may be as shown in FIG. 12. The user clicks continue and chooses the users for the Fast Track Mortgage Company (Michael Burke and Cathy Porter). At the confirmation screen (FIG. 13), the user then clicks the Save button.

Of course, the validation rules may apply to both business rules and workflows. The above is just an example and any validation rules may be created. It is a particular advantage that the validation rules can be setup and configured by a user and that the validation rules may be specified in detail using any of the available fields.

FIG. 14 shows the screen when the Routes tab 840 is selected. A mandatory route may be attached to the invoice type. Although not shown in FIG. 11, there may be a drop down menu in the Attach Route and Route Order columns of some header field rows, such as the "Ship To" and "Requestor" field rows.

FIG. 15 shows the screen when the Charges tab 850 is selected. Various charges, such as Discount, Sales Tax, and Fuel Surcharge may be selected in the "Available" drop down list. The screen will display and list the selected charges when the Add button is clicked. The Save button at the bottom of the screen is clicked to save the thus configured invoice type.

The portal can easily provide much information about invoices that have already been submitted. The specific requests that are available to a supplier or employee are determined by the permissions given by the portal administrator. Generally, the user's permission to retrieve information about submitted invoices is reflected by the presence or absence of the Reports tab within the user's portal screens.

Figure 16:
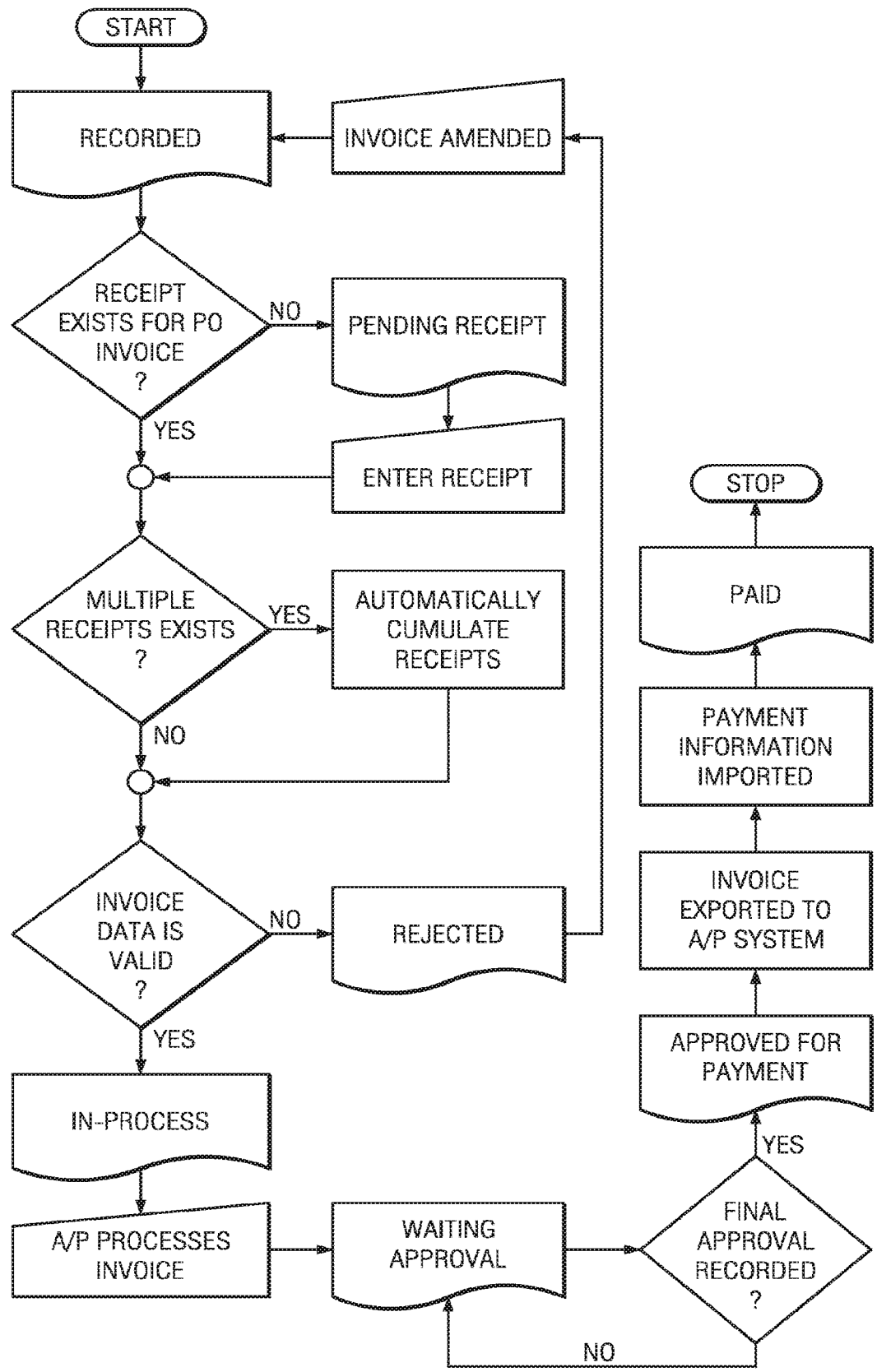
FIG. 16 is a flow chart of the processing of an electronic invoice according to a preferred embodiment of the invention.

Preferably, the information about an invoice includes its current status value, which is assigned by the portal as different processing events occur. The retrieval capability and the status value allow users to easily track the progress of an invoice. The flow chart in FIG. 16 shows the processing events and how status values are assigned to the invoices.

At any point in time, an invoice may have one of the following status values:
  Recorded—invoice has been received but has not yet been processed
  Pending Receipt—receipts need to be processed before the invoice can be processed
  Rejected—there was a problem with the validation of data on the invoice
  In Process—the invoice is being processed by the Accounts Payable Department
  Waiting Approval—the invoice has been accepted and is waiting approval to pay
  Approved for Payment—the invoice has been accepted and is awaiting payment
  Paid—the invoice has been exported and paid by the Accounts Payable software.

An invoice can be checked directly, if the invoice number is known, by typing the number in the invoice field displayed in the upper right corner of the screen. To track the invoices for a specific purchase order, the PO number is typed in the Purchase Order field. All invoices for the order will be displayed. An invoice status icon is provided to the right of the fields, and an invoice status results screen appears when the icon is clicked. A user can check the progress of invoices for more than one purchase order or check on all invoices for a specific time period by selecting the Invoice Status option from the Reports tab which appears in the Reports list on the left side of the screen.

The portal includes search criteria screens used to easily search for and locate information in the portal database. Searching can be initiated by clicking the Invoice Status icon, the Invoice Status hyperlink or the Reports tab in the All Reports list. There are many search criteria that can be used for locating invoices. Search criteria options vary by screen. The search criteria may be selected singly or in combination. At least one Search Criteria must be specified in order to generate a search result.

For example, to check on the status of an invoice, the invoice status can be used as a criteria choice to narrow the results. If the PO U-Turn search screen shown in FIG. 17 is used, the invoice status is not a criteria choice as it is not relevant to locating a purchase order. Multiple criteria can be used to speed searching. In the example of FIG. 18. multiple criteria are used to generate a list of invoices by invoice date where the invoices are unpaid due to a pending receipt or rejected validation.

A search criteria screen may provide one or more search types, which allow the user to more precisely select data. Search types usually include search fields, search operators and search filters. In the example of FIG. 19, the search field is PO number and the search operator is "starts with" (shown as a drop down).

A search filter is usually a textbox where a particular value to search is entered. Sometimes a dropdown list of values is displayed instead of a textbox. Search operators and search filters can also appear as a calendar control. To find particular dates that can be used as a search filter, the calendar control includes a calendar icon that pops up a graphical calendar. This icon is most commonly displayed on search criteria screens immediately to the right of date selection fields. The calendar icon is clicked to display the date selection calendar. The mouse is used to change the month, year or date. The desired date is clicked to transfer it to the search criteria screen. Using the search criteria screen for PO U-Turn, the example of FIG. 20 demonstrates the use of multiple search types. The illustrated search is for PO's where the PO Number field contains the search filter string "005" and for orders that were created on or between Jul. 6, 2005 and Aug. 7, 2005.

Using the search criteria screen for invoice status, the example of FIG. 21 demonstrates the use of multiple search types. The illustrated search is of the status field using a search filter value of "Rejected" and the search is refined to only include invoices that have an invoice date between Aug. 1, 2005 and Aug. 6, 2005. In the example, the single filter value of "Rejected" was used.

The status field can also be used to look for invoices in more than one status. Multiple filter values can be selected by holding the Shift key while clicking on additional list choices. The example of FIG. 22 demonstrates the use of multiple search types. The status field is searched using a search filter to find invoices that are either "In-Process" or "Waiting Approval", and the Remit To field is searched with the search filter for remit code "NY-02388" (Fast Track Office Supplies).

If there are any invoices that match the search criteria, they will be listed on the invoice status results screen in the sort order selected by the user. Each of these search criteria fields preferably exhibit dynamic functionality whereby the control changes from a drop down list into a text box with a search button depending on the number of values or records available in the current list for that field. Clicking the search button provides a pop-up search criteria screen where the user can find records for the original search field. Using additional search criteria the pop-up window also includes its own results screen that lists the records that match the search criteria. Clicking the select button of the results record will transfer that value to the previous search criteria screen. The top of the screen displays a count of the invoices and purchase orders that appear in the list. If the data is entered in a search criteria screen and there are no corresponding results in the database, a message will be returned that simply indicates that there are zero matching records. However, in most cases, there will be multiple search results and most of the search criteria screens preferably include sort by search criteria. These search criteria screens allow the user to specify how the ordering of data should be initially displayed on the search results screen. The list may be re-sorted by purchase order, invoice number, invoice date, invoice amount or status by clicking on the appropriate column title. The user can only specify an ascending sort order on search criteria screens, but search result screens can be sorted in either ascending or descending order.

In the example of FIG. 23, the user is searching for any invoice number that starts with "05". By using the sort by criteria, the user has requested that the data be displayed on the search results screen in invoice amount order In the example of FIG. 24, the user is searching for uninvoiced purchase orders for a specific buying company and within a defined period of time. By using the sort by criteria, the data will be displayed on the search results screen in PO Number order.

The portal is also preferably designed to allow the user to optimally use the search result screens. Search result screens display information based on the options selected on the associated search criteria screen or from the easy search control described below. In the example of FIG. 25, the search results are sorted in ascending order by PO Number. By default the system will display data in sequence using conventional computer standards, such as ASCII. The sort by field that is used is preferably highlighted with the up arrow icon shown to the right of the column heading (PO Number). The up arrow icon indicates that the results on the screen are shown in ascending order.

The sort sequence can be changed on the search results screen by clicking on the column title. The system will resort the data and change the direction of the arrow icon. The down arrow icon indicates that the results on the screen are sorted in descending order.

The sort column can be changed by the user. Once the search result screen has been displayed, the user has the option to change the sort criteria by clicking on any available column title on the search result screen. The example of FIG. 26, the PO U-Turn search results screen is sorted by order value through use of the Amount column heading.

A user can click on the invoice number or purchase order number hyperlinks to review the contents of each document. Clicking on the status hyperlink provides more details about the invoice as it moves through the processing steps.

Once the search results screen has been displayed, the user has the option to perform an action on any one of the items listed in the search results. In the example of FIG. 27, the PO U-Turn icon indicates that the PO listed can be converted to an invoice. The Amend icon in the Action column is selected to edit a rejected invoice.

The bottom of the Invoice Status Results screen contains a note to inform the user that unresolved rejected invoices will be purged after a specified number of days. The actual number of days is established by the portal administrator. This note is of particular interest if the results include rejected invoices. The list of invoices can be saved as an MS-Excel file or can be printed. Icons are provided at the top of the screen to let the user pick how to direct the output. Once the search results screen displays, the user has the option to export the results to Microsoft Excel by clicking the Excel icon. The system prompts the user to open or save the file using a dialog box. The Open button in the File Download window is selected to export the search results to Excel. If the list of invoices is too large to fit on one screen, another icon will appear. The save button is selected to store the search results in a Microsoft Excel file in a location of the user's choice. Once the search results screen has been displayed, the user has the option to print the results by clicking on the Print icon. The portal will display the print dialog box.

The user can begin another search at any time. If the search results screen has been displayed, the user can perform another search by clicking the new search icon on the invoice status results screen. The portal then returns the user to the search criteria screen for the tab that is currently active (e.g., Invoices or Reports).

Figure 28:
FIG. 28 is an exemplary illustration of an "Easy Search" feature in a preferred embodiment of the invention.

Preferably, the portal includes an "Easy Search" feature which is a unique single control that quickly and easily retrieves the status of an individual invoice or jumps into the creation of a new invoice by entering either an invoice, purchase order, or requisition number. The Easy Search control may appear at the top right corner of the screen and is the quickest way for a supplier to find invoice information, to create new invoices, or amend existing invoices. Depending on the permissions given to the supplier by the portal administrator, the supplier may have one or more search fields available to them. If a supplier has all the available search options available to them, they will see the Easy Search control as depicted in FIG. 28.

Figure 29:
FIG. 29 is an illustration of an invoice status check according to the Easy Search feature.

Using Easy Search, the supplier can find invoices using search criteria such as invoice number, purchase order number, or requisition number. By entering data into one of these fields, the supplier can easily check the status of an order using the status icon, create an invoice using the PO U-Turn icon, and amend a rejected invoice using the Amend icon. As shown in FIG. 29, a supplier can check on the status of an invoice with Easy Search by simply entering the Invoice Number into the invoice field and clicking the status icon. For ease of use, the fields are preferably not case sensitive, which means that the supplier can enter upper or lower case characters in the search fields (e.g., an "F" or an "f" as shown in FIG. 29).

Figure 31:
FIG. 31 is an example of an easy search using the Purchase Order field.
Figure 32:
FIG. 32 is an example of an invoice creation screen in the Easy Search feature according to a preferred embodiment of the invention.

The portal will display the invoice status results screen as shown in FIG. 30. The system displays the associated PO Number if applicable. If a user is unsure of an invoice number but knows the PO Number, they can search using the Purchase Order field as shown in FIG. 31. Clicking the status icon will provide a result similar to the invoice status screen shown in the previous figure. Clicking the PO U-Turn icon will direct the supplier to the invoice creation screen if they have been given permission to create invoices in the portal. An example of such a screen is shown in FIG. 32.

The workflow engine also allows non-purchase order based invoices that require review to be automatically routed using business rules. Those people needing to approve invoices are notified via email. Approvers use the browser to approve invoices which speeds the process. This reduces the time and cost associated with processing an invoice for payment.

In a significant feature, the software suite according to a preferred embodiment handles both purchase order invoices, and non-purchase order invoices for services and other purchases not flowing through a purchasing or procurement system. For non-purchase order invoices, the software suite provides an automated methodology to increase internal productivity and reduce the amount paid to suppliers. In particular, invoice payment control algorithms (IPCA's) prevent fraud and provide improved internal controls. Many different algorithms can be used. First, there is unit price comparison. The unit price on the invoice is automatically checked against the item master unit price that has been established for a given item number. If the actual price on the invoice is within an acceptable tolerance, then the price on the invoice is deemed accurate. There is payment frequency. If enterprise 110 receives an average of Y invoices from a supplier in a given time period, then any invoices received exceeding XY (where X is multiplier), are flagged as excessive and require a manager's approval. So for example, if a supplier averages 5 invoices per month, and the multiplier (selected by the buyer) is 2.0, then if the supplier sends more than 10 invoices in a month, the $11^{th}$ will be flagged as excessive. Another algorithm may be based on total payments. If enterprise 110 pays a supplier on average of B dollars per time period, payments made in excess of AB (where A is the multiplier), are flagged as excessive and require a manager's approval. So for example, if a supplier averages $10,000 per month and the multiplier (selected by the buyer) is 1.5, then any payments over $15,000 in a month will be flagged as excessive. Total maximums can also be entered in lieu of a calculated value. Another algorithm is the maximum amount for a single payment. Each supplier has a maximum invoice amount. Any invoice exceeding this amount is flagged as excessive, and requires a manager's approval. There may also be a duplicate payment algorithm. If the Invoice Number has already been paid the invoice cannot be paid again. If the total amount on an invoice matches (exactly) the amount on the last invoice paid for that supplier, a warning is given to the approver.

In a watch list algorithm, selected requisitioners, approvers, receivers, buyers and suppliers can be assigned to a watch list. This can be implemented where there is no separation of duties within a company, or when someone requires additional over-sight. Invoking an invoice watch list algorithm (IWLA) can impose a complete over-ride to all algorithms and require a multiple-level management review and approval process before paying an invoice, or audit trails can be emailed to a manager or system administrator when there is activity involving an entity on the watch list. These serve as warnings to management. In a post-transaction algorithm, audit reports can be viewed or printed after the completion of the non-PO Invoice approval process. These provide post-period controls.

There may also be user-defined algorithms. These can be customized to meet a company's business rules. The software can be configured to either automatically approve invoices that pass all algorithm tests. Alternatively, invoices can be sent through their normal workflow rules (depending on invoice type, dollar limitations, etc.) and display a warning to the approver that the "Invoice Amount may be Excessive". Approval would be required to move the invoice to the next level of approval. Yet another option is to reject all invoices that fail a given algorithm test and place them in a "reject suspense" file that requires review by the Finance/Accounting Department or other manager before approval.

Associated with the algorithms, there may also be an on-line "payment history card" that can be accessed for each supplier. This tool helps approvers determine if an invoice should be paid. The algorithms can automatically be re-calculated based on the last X month's activity levels if the system administrator desires.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. An electronic invoicing system for processing electronic invoices, the system comprising:
 a processor; and
 a memory, coupled to the processor, storing code that when executed by the processor causes the processor to:
  establish communication with a first computer system:
  establish communication with a second computer system;
  provide data from a web-based portal via a network to the first computer system of a supplier to cause the first computer system to display respective views for a supplier to electronically submit one or more electronic invoices via the first computer system;
  receive submitted one or more electronic invoices from the first computer system via the web-based portal;
  store the submitted one or more electronic invoices received from the first computer system in one or more storage devices that are accessible to the first computer system for retrieval by the first computer system;
  process the electronic invoices submitted via the first computer system in accordance with processing rules stored in the first computer system;
  generate data to cause display of a computer generated user interface that enables the supplier to request status data for one or more non-rejected electronic invoices submitted via the first computer system;
  receive a request for the status data for the one or more non-rejected electronic invoices submitted via the first computer system;
  provide the requested status data in order to communicate a status of the one or more non-rejected electronic invoices to the supplier;
  generate data to cause display of an interface to the second computer system that receives input from a user of the second computer system to administer the one or more electronic invoices submitted through the web-based portal; and control a portal manager through the interface of the second computer system to switch to other web-based portals to administer invoices submitted through the other web-based portals while maintaining a consistent interface of the second computer system for administering all the invoices submitted through all the web-based portals.

2. The system of claim 1 wherein to generate data to cause display of a computer generated user interface that enables the supplier to request status data for one or more non-rejected electronic invoices submitted via the first computer system further comprises to:
generate data with the electronic invoicing system to cause display of a computer generated user interface that enables the supplier to search for specific invoice status type data, wherein the status type data comprises at least two members of a group consisting of in-process, waiting approval, approved for payment, and paid.

3. The system of claim 1 wherein to receive a request for the status data for the one or more non-rejected electronic invoices submitted via the first computer system comprises receiving the request for the status data for one or more non-rejected electronic invoices associated with at least one non-purchase order.

4. The system of claim 1 wherein to receive a request for the status data for the one or more non-rejected electronic invoices submitted via the first computer system comprises receiving the request for the status data for one or more non-rejected electronic invoices associated with at least one purchase order.

5. The system of claim 1 wherein to generate data to cause display of a computer generated user interface that enables the supplier to request status data for one or more non-rejected electronic invoices submitted via the first computer system further comprises generating data with the electronic invoicing system to cause display of a computer generated user interface that enables the supplier to request status data for one or more rejected electronic invoices submitted via the first computer system, the method further comprising:
receiving data to amend a rejected invoice.

6. The system of claim 1 the code is further executable by the processor to:
provide data to the first computer system to cause the first computer system to allow the supplier to generate the one or more electronic invoices.

7. The system of claim 6 the code is further executable by the processor to:
providing data to the first computer system to cause the first computer system to allow the supplier to generate the one or more electronic invoices pertaining to a purchase order that originated as a requisition.

8. The system of claim 1, wherein to provide the requested status data in order to communicate a status of the one or more non-rejected electronic invoices to the supplier further comprises providing the requested status data for display of a results screen in a sort order selected by a user of the first computer system.

9. The system of claim 8, wherein the status comprises a number of records and the requested status data includes data to cause display of the results screen as a text box with a search button.

10. The system of claim 1 the code is further executable by the processor to:
process the submitted electronic invoices using one or more algorithmic tests;
determine by the one or more algorithmic tests whether one or more of the submitted electronic invoices qualifies for automatic payment approval; and
approve payment automatically for each of the submitted electronic invoices that qualify for automatic payment approval.

11. The system of claim 1 the code is further executable by the processor to:
provide data to the second computer system, to cause display of a computer generated user interface that enables the user of the second computer system to create an invoice type; and
receive inputs from the user of the second computer system that define business process rules and work flow to process the one or more electronic invoices submitted via the first computer system of the supplier that conform to the invoice type, wherein the business process rules and work flow are customized per the invoice type.

12. The system of claim 11 wherein to receive inputs from the user of the second computer system further comprises receiving inputs from the user of the second computer system that define at least a subset of the business process rules and work flow for multiple invoice fields and for multiple invoice types.

13. A non-transitory, computer readable medium that comprises code executable by a processor to implement an electronic invoicing system to:
establish communication with a first computer system:
establish communication with a second computer system;
provide data from a web-based portal via a network to the first computer system of a supplier to cause the first computer system to display respective views for a supplier to electronically submit one or more electronic invoices via the first computer system;
receive submitted one or more electronic invoices from the first computer system via the web-based portal;
store the submitted one or more electronic invoices received from the first computer system in one or more storage devices that are accessible to the first computer system for retrieval by the first computer system;
process the electronic invoices submitted via the first computer system in accordance with processing rules stored in the first computer system;
generate data to cause display of a computer generated user interface that enables the supplier to request status data for one or more non-rejected electronic invoices submitted via the first computer system;
receive a request for the status data for the one or more non-rejected electronic invoices submitted via the first computer system;
provide the requested status data in order to communicate a status of the one or more non-rejected electronic invoices to the supplier;
generate data to cause display of an interface to the second computer system that receives input from a user of the second computer system to administer the one or more electronic invoices submitted through the web-based portal; and
control a portal manager through the interface of the second computer system to switch to other web-based portals to administer invoices submitted through the other web-based portals while maintaining a consistent interface of the second computer system for administering all the invoices submitted through all the web-based portals.

14. The non-transitory, computer readable medium of claim 13 wherein to generate data to cause display of a computer generated user interface that enables the supplier to request status data for one or more non-rejected electronic invoices submitted via the first computer system further comprises to:
generate data to cause display of a computer generated user interface that enables the supplier to search for specific invoice status type data, wherein the status type data comprises at least two members of a group consisting of in-process, waiting approval, approved for payment, and paid.

15. The non-transitory, computer readable medium of claim 13 wherein to receive a request for the status data for the one or more non-rejected electronic invoices submitted via the first computer system comprises to receive the request for the status data for one or more non-rejected electronic invoices associated with at least one non-purchase order.

16. The non-transitory, computer readable medium of claim 13 wherein to receive a request for the status data for the one or more non-rejected electronic invoices submitted via the first computer system comprises receiving the request for the status data for one or more non-rejected electronic invoices associated with at least one purchase order.

17. The non-transitory, computer readable medium of claim 13 wherein to generate data to cause display of a computer generated user interface that enables the supplier to request status data for one or more non-rejected electronic invoices submitted via the first computer system further comprises to generate data to cause display of a computer generated user interface that enables the supplier to request status data for one or more rejected electronic invoices submitted via the first computer system.

18. The non-transitory, computer readable medium of claim 13 the code is further executable by the processor to:
provide data for the first computer system to cause the first computer system to allow the supplier to generate the one or more electronic invoices.

19. The non-transitory, computer readable medium of claim 18 the code is further executable by the processor to:
provide data for the first computer system to cause the first computer system to allow the supplier to generate the one or more electronic invoices pertaining to a purchase order that originated as a requisition.

20. The non-transitory, computer readable medium of claim 13, wherein to provide the requested status data in order to communicate a status of the one or more non-rejected electronic invoices to the supplier further comprises to provide the requested status data for display of a results screen in a sort order selected by a user of the first computer system.

21. The non-transitory, computer readable medium of claim 20, wherein the status comprises a number of records and the requested status data includes data to cause display of the results screen as a text box with a search button.

22. The non-transitory, computer readable medium of claim 13 the code is further executable by the processor to:
process the submitted electronic invoices using one or more algorithmic tests;
determine by the one or more algorithmic tests whether one or more of the submitted electronic invoices qualifies for automatic payment approval; and
approve payment automatically for each of the submitted electronic invoices that qualify for automatic payment approval.

23. The non-transitory, computer readable medium of claim 13 the code is further executable by the processor to:
provide data to the second computer system, to cause display of a computer generated user interface that enables the user of the second computer system to create an invoice type; and
receive inputs from the user of the second computer system that define business process rules and work flow for the electronic invoicing system that processes the one or more electronic invoices submitted via the first computer system of the supplier that conform to the invoice type, wherein the business process rules and work flow are customized per the invoice type.

24. The non-transitory, computer readable medium of claim 23 wherein to receive inputs from the user of the second computer system further comprises receiving inputs from the user of the second computer system that define at least a subset of the business process rules and work flow for multiple invoice fields and for multiple invoice types.

* * * * *